(12) United States Patent
Saine et al.

(10) Patent No.: US 12,325,037 B2
(45) Date of Patent: Jun. 10, 2025

(54) PERFORMANCE SOLENOID ASSEMBLY

(71) Applicant: NORDSON CORPORATION, Westlake, OH (US)

(72) Inventors: Joel E. Saine, Dahlonega, GA (US); Sang Hyub Shin, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 776 days.

(21) Appl. No.: 17/467,583

(22) Filed: Sep. 7, 2021

(65) Prior Publication Data
US 2022/0080449 A1 Mar. 17, 2022

Related U.S. Application Data

(60) Provisional application No. 63/079,833, filed on Sep. 17, 2020.

(51) Int. Cl.
*B05B 15/65* (2018.01)
*B05B 9/01* (2006.01)
(Continued)

(52) U.S. Cl.
CPC ............ *B05B 15/65* (2018.02); *B05B 9/01* (2013.01); *B05B 9/04* (2013.01); *B05C 5/0225* (2013.01); *B05C 5/0237* (2013.01); *B05C 11/1002* (2013.01); *F16K 1/00* (2013.01); *F16K 1/32* (2013.01); *F16K 1/385* (2013.01); *F16K 27/0254* (2013.01); *F16K 31/1223* (2013.01); *F16K 47/02* (2013.01)

(58) Field of Classification Search
CPC . B05C 5/0225; B05C 11/1002; B05C 5/0237; B05B 9/04; B05B 15/65; B05B 9/01; F16K 1/00; F16K 1/32; F16K 1/385; F16K 27/0254; F16K 31/1223; F16K 47/02
See application file for complete search history.

(56) References Cited

U.S. PATENT DOCUMENTS 6,832,788 B2 * 12/2004 Fukano ................... F16L 41/03
285/125.1
7,857,173 B2 * 12/2010 Bolyard, Jr. .......... F16K 27/003
285/305
(Continued)

OTHER PUBLICATIONS

Supplementary European search report Mailed on Feb. 18, 2022 for EP Application No. 21197427.

*Primary Examiner* — Frederick C Nicolas
(74) *Attorney, Agent, or Firm* — BakerHostetler

(57) ABSTRACT

In one example, an adhesive dispensing assembly has a dispenser and an air supply assembly. The dispenser receives a liquid material therein and discharges the liquid material onto a substrate. The air supply assembly receives pressurized air therein and directs the pressurized air to the dispenser to cause discharging of the liquid material from the dispenser. The dispenser has a first coupler, and the air supply assembly has a second coupler that couples to the first coupler so as to positionally fix the dispenser and the air supply assembly to one another. At least one of the first and second couplers is formed from a thermally insulating material that thermally insulates the dispenser and the air supply assembly from one another when the first and second couplers are coupled to one another.

36 Claims, 14 Drawing Sheets

(51) Int. Cl.
 *B05B 9/04* (2006.01)
 *B05C 5/02* (2006.01)
 *B05C 11/10* (2006.01)
 *F16K 1/00* (2006.01)
 *F16K 1/32* (2006.01)
 *F16K 1/38* (2006.01)
 *F16K 27/02* (2006.01)
 *F16K 31/122* (2006.01)
 *F16K 47/02* (2006.01)

(56) References Cited

U.S. PATENT DOCUMENTS

| | | | |
|---|---|---|---|
| 9,671,039 B2* | 6/2017 | Saine | B05C 5/0237 |
| 11,969,748 B2* | 4/2024 | Burmester | F16K 31/124 |
| 2003/0197369 A1* | 10/2003 | Fukano | F16L 39/00 |
| | | | 285/124.3 |
| 2006/0097010 A1* | 5/2006 | Riney | B05C 5/001 |
| | | | 222/146.5 |
| 2008/0006658 A1* | 1/2008 | Bolyard | B05C 5/0237 |
| | | | 285/305 |
| 2013/0052359 A1* | 2/2013 | Ahmadi | B05C 5/0225 |
| | | | 137/624.13 |
| 2014/0006658 A1* | 1/2014 | Chen | G06F 13/387 |
| | | | 710/63 |
| 2014/0361203 A1 | 12/2014 | Saine | |
| 2016/0263608 A1 | 9/2016 | Saine | |

* cited by examiner

PERFORMANCE SOLENOID ASSEMBLY

CROSS-REFERENCE TO RELATED APPLICATION

This application claims priority to U.S. Provisional Application No. 63/079,833, filed Sep. 17, 2020, which is incorporated by reference herein in its entirety.

TECHNICAL FIELD

This disclosure generally relates to devices and methods of dispensing liquids onto substrates, and more particularly relates to a new design for a pneumatically actuated dispensing valve for dispensing hot melt adhesive.

BACKGROUND

In existing pneumatically actuated liquid dispensing systems, such as those designed to dispense liquid hot melt adhesives, pressurized air is often used to actuate one or more components to cause the liquid to be dispensed onto a substrate. An air supply device, such as an electrically operated solenoid valve, can be used to supply and switch the actuating air. When the solenoid is electrically activated to supply pressurized air to the liquid dispensing valve, the pressurized air acts against an actuator, such as a movable piston or diaphragm. This opens the liquid dispensing valve and allows for dispensing of the liquid.

In some conventional dispensing systems, the arrangement and engagement of the air supply device and the liquid dispensing valve make it difficult to service the assemblies and to maintain consistent and accurate dispensing of the liquid. Therefore, there is a need for an improved structure of dispensing systems that allows for better access to components while maintaining the desired technical capabilities.

SUMMARY

In one example, an adhesive dispensing assembly comprises a dispenser and an air supply subassembly. The dispenser is configured to receive a liquid material therein and to discharge the liquid material therefrom onto a substrate. The air supply assembly is configured to receive pressurized air therein and to direct the pressurized air to the dispenser to cause discharging of the liquid material from the dispenser. The dispenser comprises a first coupler, and the air supply assembly comprises a second coupler that is configured to couple to the first coupler so as to positionally fix the dispenser and the air supply assembly to one another. At least one of the first and second couplers is formed from a thermally insulating material that is configured to thermally insulate the dispenser and the air supply assembly from one another when the first and second couplers are coupled to one another.

In another example, an air supply assembly for an adhesive dispenser comprises a control valve and a first coupler. The control valve defines an air inlet channel and at least one air channel configured to direct air to the adhesive dispenser. The control valve is configured to receive pressurized air from the air inlet channel and to direct the pressurized air to the at least one air channel. The first coupler is configured to releasably engage a second coupler of the adhesive dispenser. The first coupler defines at least one air channel therethrough that is configured to direct air between the adhesive dispenser and the at least one air channel of the control valve. The first coupler is formed from a thermally insulating material and is arranged between the dispenser side and the control valve.

Yet another example is a method of connecting an air supply assembly to an adhesive dispenser. The air supply assembly has a first coupler and the adhesive dispenser has a second coupler. At least one of the first and second couplers is formed from a thermally insulative material. The method comprises a step of coupling the first and second couplers to one another such that the dispenser and the air supply assembly are positionally fixed to one another, the thermally insulative material is between the adhesive dispenser and the air supply assembly, and at least one air channel that extends from the air supply assembly through the first coupler is aligned with at least one air channel that extends through the second coupler to the adhesive dispenser.

BRIEF DESCRIPTION OF THE DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Liquid can be dispensed from a dispensing head by actuating a movable component to open or close an outlet of the dispensing head. The liquid, for example a hot-melt adhesive, is supplied to the dispensing head from a liquid source, moved through the dispensing head, and discharged from the outlet of the dispensing head onto a substrate. The rate of discharging and the pattern of discharging can be predetermined and controlled by a user, an electronic controller, or both. It will be understood that various discharging rates and patterns of discharging can be achieved, and that different liquids may be discharged from the dispensing heads disclosed here.

The movement of the movable component may be controlled by pressurized air that is received in the dispensing head from an air source. An electrically operated air supply device can interact with various air passageways to direct the flow of pressurized air.

Figure 1:
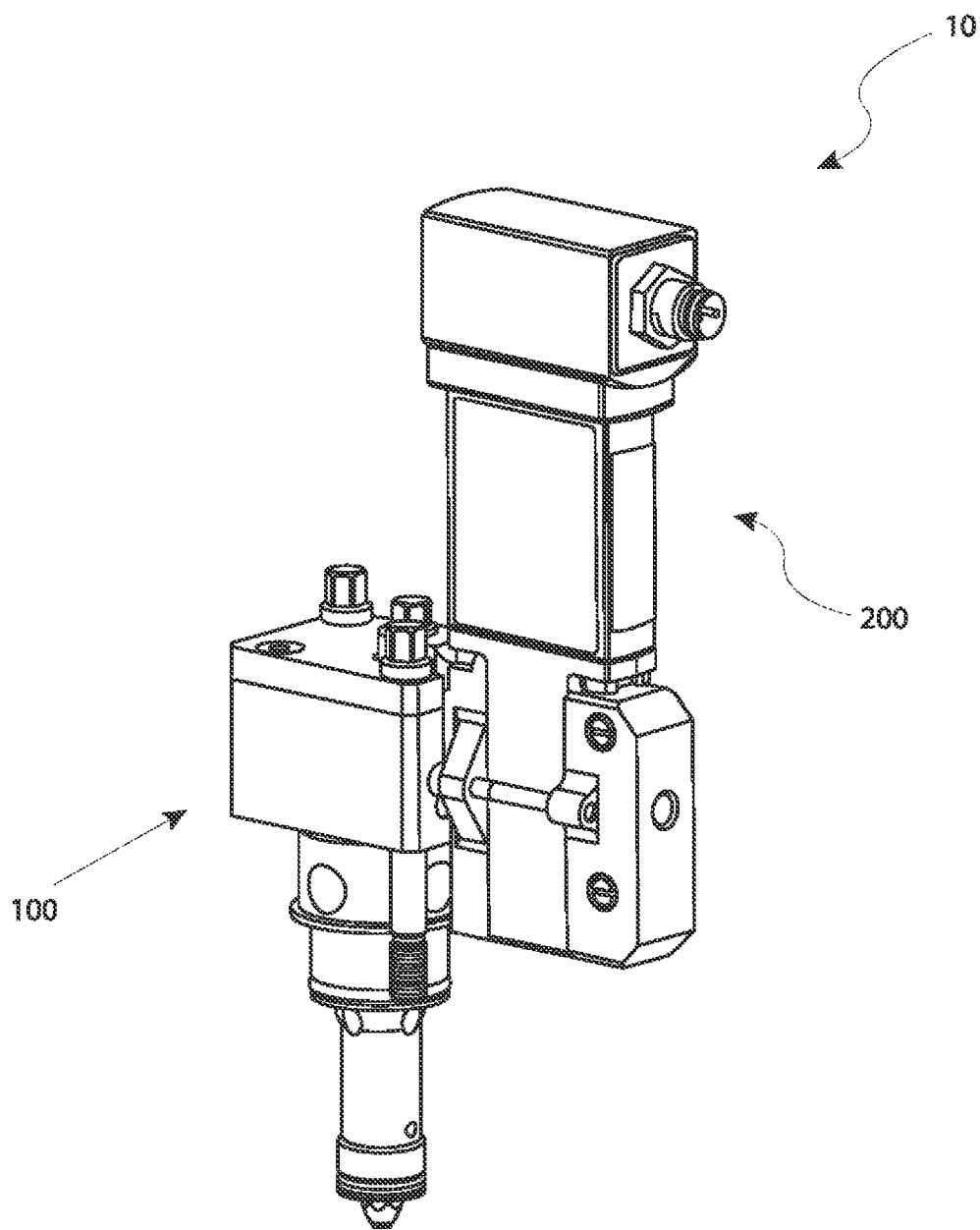
FIG. 1 illustrates a perspective view of a dispensing assembly according to an example of the disclosure.
Figure 2:
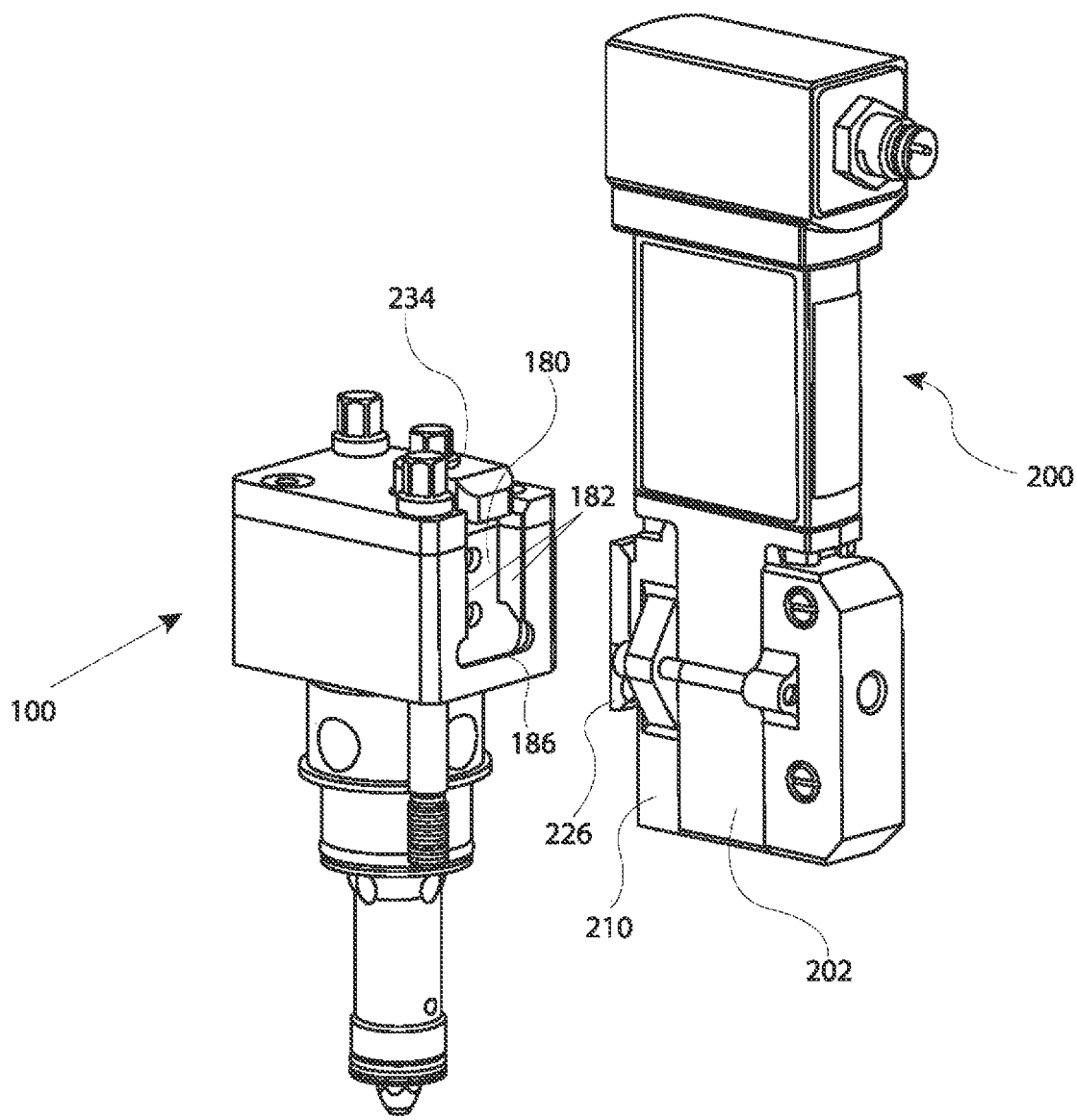
FIG. 2 illustrates a perspective view of the dispensing assembly of FIG. 1 showing the dispenser separate from the air supply assembly.
Figure 3:
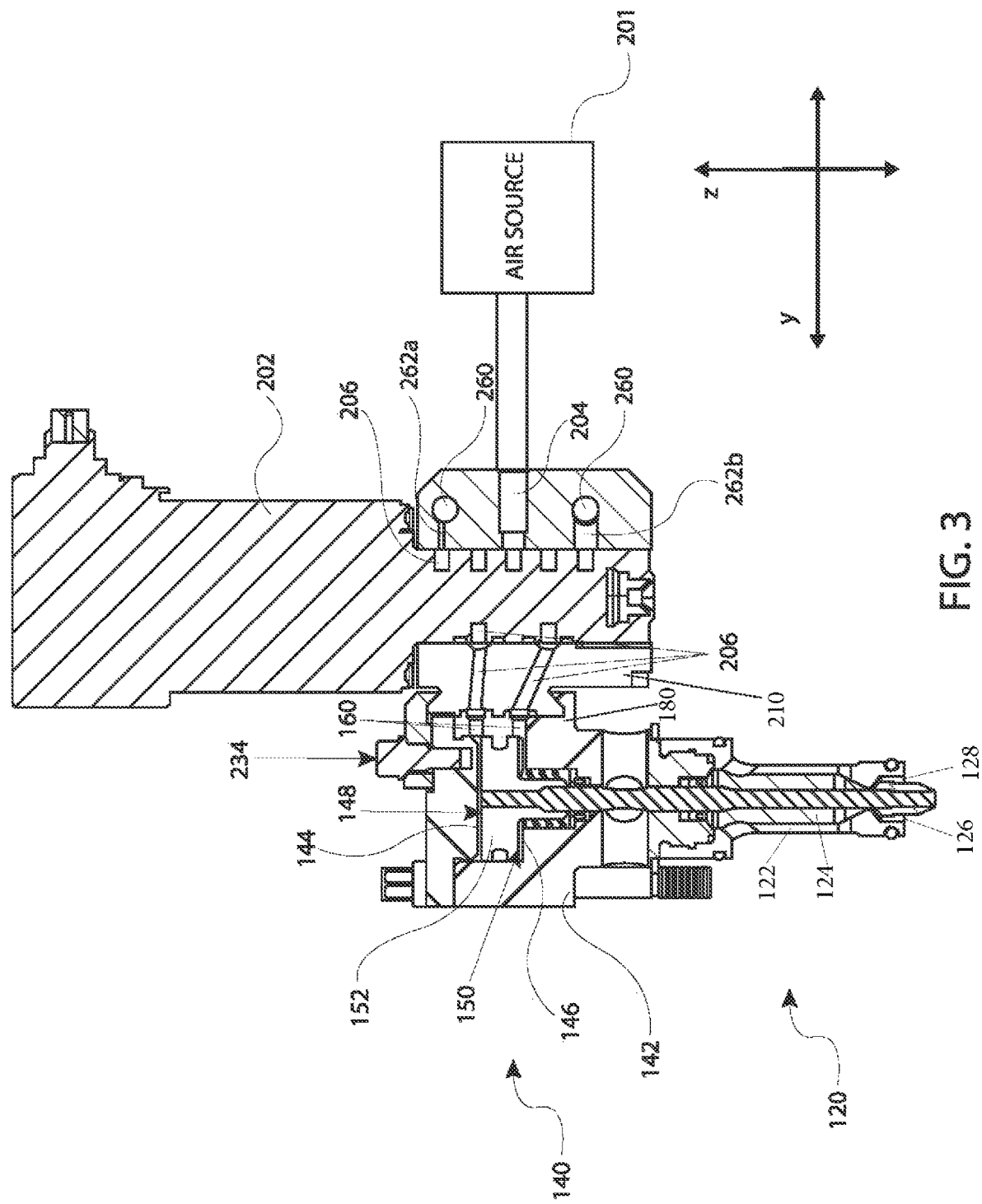
FIG. 3 illustrates a side cross-sectional view of the dispensing assembly of FIG. 1.

Referring to FIGS. 1-3, an exemplary dispensing assembly 10 is depicted having a liquid material dispenser 100 and an air supply assembly 200. The dispenser 100 is configured to receive the liquid material from a liquid material source to be dispensed onto a substrate. The air supply assembly 200 is configured to receive air from an air source 201 (FIG. 3) and to distribute the air to the dispenser 100 to cause dispensing of the liquid material therefrom. The liquid material may be supplied to the dispenser 100 via a manifold (not shown) connected thereto. The manifold may be heated. It will be appreciated that the liquid material dispenser 100 and the manifold may be integrated together or coupled in any desired manner. In some embodiments, process or pattern air may be supplied to the dispenser 100 to act on the liquid material when the liquid material is in the process of being dispensed, or has already been dispensed, from the dispenser 100 towards a substrate. In some aspects, process or pattern air may be used to impart a number of patterns, for example a swirl motion, to the discharged or extruded liquid, for example, to hot-melt adhesive. This may be accomplished in various known manners.

The liquid material dispenser 100 includes a dispensing portion 120 and an actuation portion 140 (see FIG. 3). In some examples, the dispensing portion 120 may be spaced from the actuation portion 140 along a vertical direction z. The material being dispensed can be introduced into the dispensing portion 120 and is dispensed therefrom. The dispensing portion 120 is configured to be operatively coupled with the actuation portion 140, which is configured to control the dispensing of the material from the dispensing portion 120. This disclosure is not intended to limit the particular shape and/or dimensions of the actuation portion 140, the dispensing portion 120, or the relative arrangement and engagement between the dispensing and actuation portions 120, 140. It will be appreciated that the descriptions herein and accompanying figures are examples, and that other suitable arrangements are envisioned.

Figure 4:
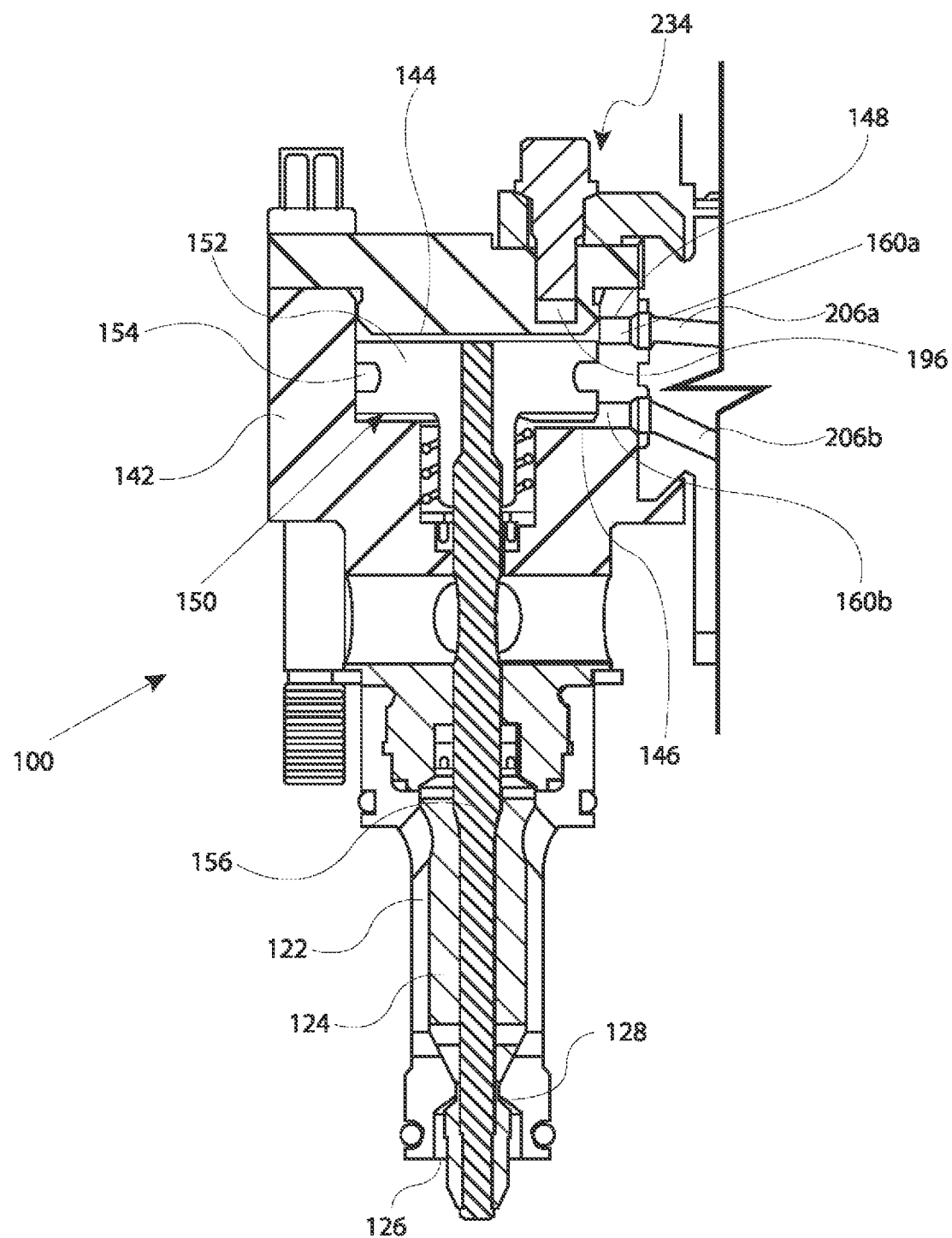
FIG. 4 illustrates a side cross-sectional view of a dispenser according to an example of the disclosure.

According to some examples and referring to FIGS. 3 and 4, the actuation portion 140 includes a housing 142 having a first end 144 and a second end 146 opposite the first end 144. The housing 142 defines at least a first chamber 148 and a second chamber 150. The first and second chambers 148, 150 are separated from each other by a movable plunger 152 that is configured to move within the housing 142 between the first and second ends 144, 146. The first and second chambers 148, 150 are configured to receive air from the air supply assembly 200, as will be described in detail below.

The first chamber 148 may be defined between the plunger 152 and the first end 144. The second chamber 150 may be defined between the plunger 152 and the second end 146. The plunger 152 may include a seal 154 thereon to prevent any air from passing between the housing 142 and the plunger 152 from the first chamber 148 to the second chamber 150 or vice versa.

A valve stem 156 may be disposed within the dispenser 100. The valve stem 156 may be disposed within, and extend through, the dispensing portion 120 and the actuation portion 140. The valve stem 156 may be affixed to the plunger 152, such that when the plunger 152 is moved, the valve stem 156 is also moved. The plunger 152 is configured to be moved in a first direction away from the first end 144 towards the second end 146 or in a second direction away from the second end 146 towards the first end 144.

The dispensing portion 120 includes a valve body 122 that defines a dispensing chamber 124 therein. The dispensing chamber 124 is configured to receive the liquid material that is to be dispensed from the dispenser 100. The valve body 122 defines an outlet 126 thereon. A valve seat 128 is defined on the valve body 122 adjacent the outlet 126 and is configured to be selectively contacted by the valve stem 156. The outlet 126 is configured to be selectively opened or closed. When the outlet 126 is open, the liquid material within the dispensing chamber 124 is permitted to pass through and out of the outlet 126 to exit the dispensing chamber 124. When the outlet 126 is closed, the liquid material in the dispensing chamber 124 is precluded from passing through the outlet 126. When the valve stem 156 is in contact with the valve seat 128, a liquid-tight seal is formed between the valve seat 128 and the valve stem 156, and the outlet 126 is closed. When the valve stem 156 is spaced away from the valve seat 128, no seal is formed between the valve stem 156 and the valve seat 128, and the outlet 126 is open. When the plunger 152 is moved in the first direction as described above, the valve stem 156 may be moved towards and placed in contact with the valve seat 128. When the plunger 152 is moved in the second direction, the valve stem 156 may be moved away from the valve seat 128.

The actuation of valve components and the selective opening and closing of the outlet 126 can be accomplished in a variety of ways and may utilize different dispensing mechanisms and techniques. Although exemplary aspects described herein reference specific structures and methods of operating a valve to open or close the outlet 126, this disclosure is not intended to be limited to any specific method or structure of a valve. In the exemplary aspects described throughout this application, the selective opening and closing of the outlet 126 is accomplished by causing the plunger 152, as well as the attached valve stem 156, to move in a first or second direction. Movement of the plunger 152 may be caused by introduction of a pressurized gas into the first chamber 148 or the second chamber 150. In some aspects, the pressurized gas can include air.

The air or other pressurized gas is introduced into the air supply assembly 200. The air supply assembly 200 is configured to receive the air and to direct the air to the first chamber 148 or the second chamber 150. The air supply assembly 200 includes a control valve 202. In the disclosed example, the control valve 202 may be a solenoid valve. It will be understood that, although the aspects described refer to a solenoid valve, other suitable valves may be utilized.

As shown in FIGS. 3-7, the air supply assembly 200 is configured to receive air from an air inlet 204. The air supply assembly 200 includes a plurality of channels 206 extending therethrough, the plurality of channels 206 extending generally between the air inlet 204 and a corresponding plurality of channels 160 extending through the dispenser 100. In some aspects, the plurality of channels 206 may extend through the control valve 202. The plurality of channels 206 may further extend into and through the first coupler 210. In some examples, the plurality of channels 206 may extend into and through the second coupler 180. Actuation of the control valve 202 causes one or more of the plurality of channels 206 in the control valve 202 to move into and/or out of alignment with the air inlet 204 and with one or more of the plurality of channels 160 in the dispenser 100. This alignment/dealignment allows for the air to be directed from the air inlet 204, through the channels in the control valve 202, through the channels in the dispenser 100, and to the desired location, for example, the first chamber 148 or the second chamber 150.

The air supply assembly 200 should be operationally connected to the liquid material dispenser 100 such that the air supply assembly 200 can direct air to the dispenser 100 as described above to cause dispensing of the liquid material. In some existing systems, the existing air supply assemblies are spaced apart from the existing liquid material dispensers at a predetermined distance. The air supply assemblies are connected to the liquid material dispensers via tubes, fittings, or other connectors. Thus, to service the existing dispensing assemblies, individual tubes need to be connected/disconnected in the necessary order and arrangement. A user must connect/disconnect tubes individually by tightening/loosening fittings that secure the tubes to the air supply assemblies at one end and to the liquid material dispensers at the other ends. These steps require added time to ensure the correct tube is being serviced, the proper force is applied to the fasteners, and the tube is connected to the correct connector on each component. The more tubes present in a system, the longer such maintenance would take. The above processes also increase the risks of user error, such as connecting/disconnecting an incorrect tube, overtightening a connection and damaging the connectors, under-tightening a connection and causing a leak, or inadvertently damaging the tube, fasteners, or other components. Thus, it is desirable to have a dispensing assembly 10 that minimizes maintenance time, decreases chances of user error, and allows fast, easy, and safe coupling/decoupling of the air supply assembly 200 to/from the dispenser 100.

As shown generally in FIGS. 1-10, examples of a dispensing assembly 10 are depicted having an exemplary coupling arrangement that allows for quicker and easier connecting/disconnecting of the air supply assembly 200 to/from the dispenser 100 compared to existing systems. A first coupler 210 is disposed on the air supply assembly 200 and is configured to releasably engage with a corresponding second coupler 180 disposed on the dispenser 100.

Figure 11:
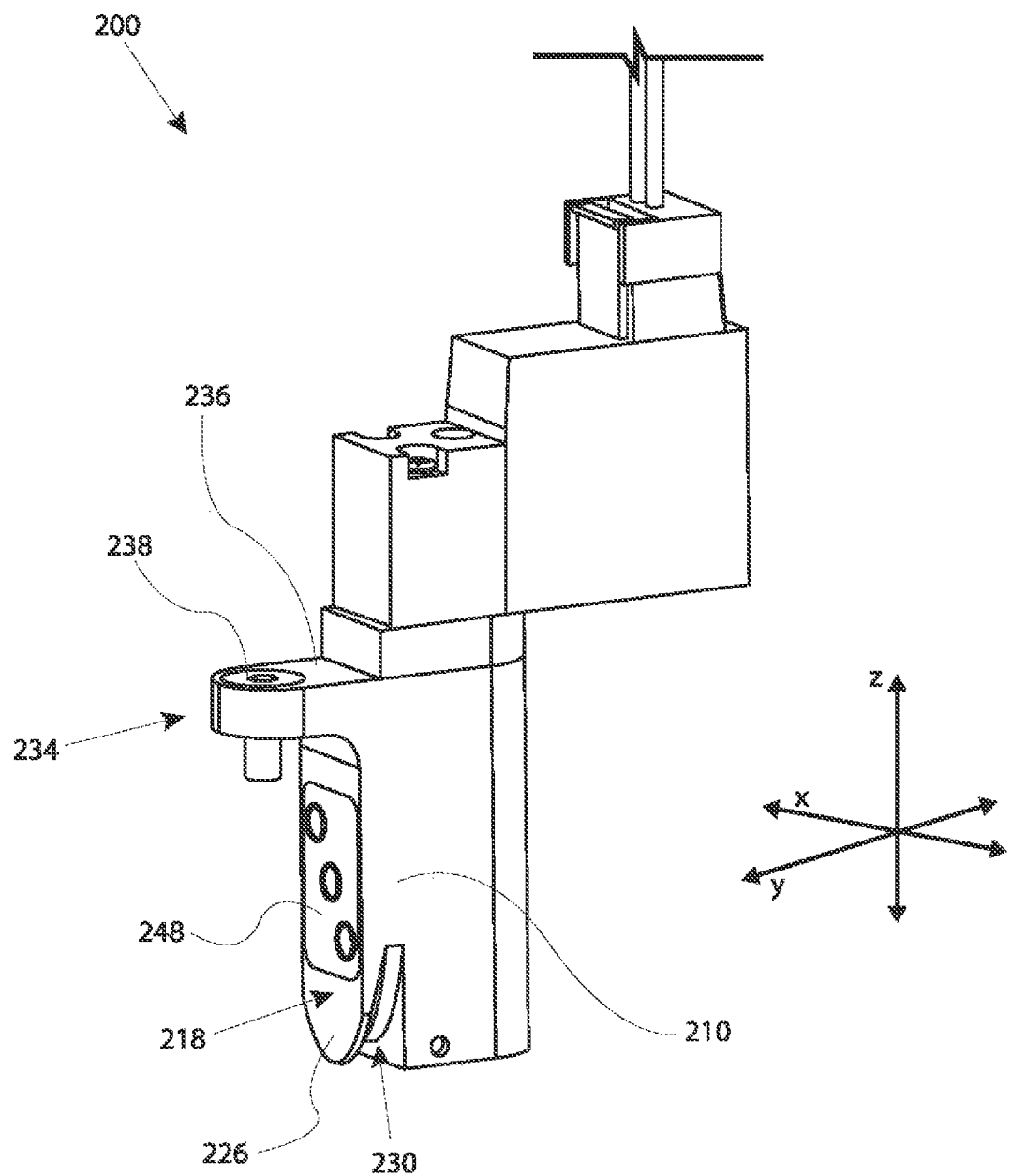
FIG. 11 illustrates a perspective view of an air supply assembly according to another example of the disclosure.

Referring specifically to FIGS. 6-9, the first coupler 210 may be a separate component that is fastened to the control valve 202, as shown in the figures. Alternatively, the first coupler 210 may be integral and monolithic with a housing of the control valve 202 and/or other components of the air supply assembly 200 as shown in FIG. 11. Similarly, the second coupler 180 may be a separate component that is fastened to the dispensing portion 120 or the actuation portion 140. Alternatively, at least a portion of the second coupler 180 may be integral and monolithic with a housing of the dispenser 100 as shown in FIG. 2. It will be appreciated that in some arrangements, the first coupler 210 may alternatively be disposed on the air supply assembly 200, while the second coupler 180 may be alternatively disposed on the dispenser 100.

The first coupler 210 may be releasably affixed to the air supply assembly 200, for example to the control valve 202, via one or more fasteners 214. As shown in the figures, for example, the first coupler 210 may be affixed to the control valve 202 via three fasteners 214. It will be understood that other mechanisms of fastening are envisioned, such as rivets, welds, clamps, adhesives, or other affixing components.

The first coupler 210 may include a first, dispenser side 218 and a second, supply side 222 opposite the first side 218. The first side 218 can include an engagement that is configured to face the dispenser 100 in a longitudinal direction y (see FIG. 3). When the first coupler 210 is affixed to the control valve 202, the second side 222 is configured to face the control valve 202. The second side 222 may directly contact a portion of the control valve 202. The first side 218 may be disposed opposite the second side 222 and spaced from the second side 222 along the longitudinal direction y, which is orthogonal to the vertical direction z. When the first and second couplers 210, 180 are engaged with each other, the first side 218 is configured to face the dispenser 100. The first side 218 may directly contact the dispenser 100, for example, at an engagement surface 184 defined on the dispenser 100. When the first and second couplers 210, 180 are in contact with each other, the engagement surface 184 is configured to be facing the first coupler 210 and/or the control valve 202.

Referring to the example depicted in FIGS. 1-7, the first side 218 and the second side 222 are disposed in planes defined by the vertical direction z and a transverse direction x, which is orthogonal to both, the vertical direction z and the longitudinal direction y. It will be understood that the specific shape and orientation of each of the first and second side 218, 222 will depend on the type of dispenser 100 and the air supply assembly 200, as well as on the relative orientation and arrangement of the dispenser 100 and the air supply assembly 200 and related components.

The first coupler 210 may be configured to engage with the second coupler 180 via a variety of coupling mechanisms, for example, fasteners, hinges, friction fit, clamps, joints, or other suitable couplers. In some examples, as shown, one of the first and second couplers 210 and 180 may define a plug, and the other of the first and second couplers 210 and 180 may define a receptacle that receives the plug. The first and second couplers 210 and 180 may be movable relative to one another between a disengaged configuration, an engaged configuration, and a locked configuration. In the disengaged configuration, the first and second couplers 210 and 180 are not in engagement with one another. In the engaged configuration, the first and second couplers 210, 180 are engaged and in contact with one another, such that relative movement between the first and second couplers 210, 180 is precluded along at least one, but not all, directions. In one example, relative movement can be precluded along the transverse direction x and the longitudinal direction y, but not the vertical direction z. However, it will be understood that, in alternative examples, the relative movement can be precluded in any single one or any pair of the transverse direction x, the vertical direction z, and the longitudinal direction y. In the locked configuration, the first and second couplers 210, 180 can be engaged with one another such that relative movement between the first and second couplers 210, 180 is prevented in all directions. It will be understood that this application is not limited to a particular first or second connector and that various embodiments are anticipated. Some exemplary embodiments are described below and depicted in the referenced figures.

Referring specifically to the example depicted in FIGS. 6-9, the coupler 210 may be configured to releasably engage with the coupler 180 via engagement of complementary joints. The joints may be dovetail joints or other suitable joints. For instance, the first coupler 210 can comprise a first connector that defines at least one of a protrusion and a recess. The second coupler 180 can comprise a first connector that defines another of the protrusion and recess. The first connectors of the first and second couplers 210 and 180 are configured to couple to one another. For example, the recess is configured to receive the protrusion. The protrusion can extend along the vertical direction z, and the recess can be configured to receive the protrusion along the vertical direction z. In the example of FIGS. 6-9, the first coupler 210 comprises a protrusion 226 (labeled in FIG. 6), which extends from the first side 218. The protrusion 226 may also extend in a direction away from the first side 218. The second coupler 180 defines a recess 192 that is configured to receive the protrusion 226 when the first and second couplers 210 and 180 are in the engaged configuration.

Optionally, the first connector of each of the first and second couplers 210 and 180 can comprise a protrusion and define a recess. For example, the first connector of the first coupler 210 can additionally define a recess 230 between the first protrusion 226 and the first side 218. Further, the second coupler 180 may include a protrusion 188 extending away from the engagement surface 184, where the recess 192 is defined between the protrusion 188 and the engagement surface 184. The recess 230 is configured to receive the protrusion 188 therein when the first and second couplers 210 and 180 are in the engaged configuration. In some aspects, the recess 192 may be configured to receive the protrusion 226 therein, such that the protrusion 226 is disposed, at least in part, between the engagement surface 184 and the protrusion 188. Similarly, in some aspects, the recess 230 may be configured to receive the protrusion 188 therein, such that the protrusion 188 is disposed, at least in part, between the first side 218 and the protrusion 226.

The engagement of the first and second protrusions 226, 188 with the first and second recesses 230, 192 as described above allows for the first coupler 210 to be releasably secured to the second coupler 180. When the first and second couplers 210, 180 are secured in such a manner, the first connectors of the first and second couplers 210, 180 are precluded from being separated by movement along the longitudinal direction y. To connect the first and second couplers 210, 180, one of the dispenser 100 and the air supply assembly 200 can be moved along the longitudinal, transverse, and vertical directions x, y, and z such that the first protrusion 226 and the second recess 192 are aligned in the longitudinal direction y and the transverse direction x while being separated along the vertical direction z. Then, at least one of the dispenser 100 and the air supply assembly 200 can be moved towards the other along the vertical direction z until the first protrusion 226 is received into the second recess 192 as described above. To disconnect the first and second couplers 210, 180, the above steps may be reversed. For example, one of the dispenser 100 and the air supply assembly 200 may be moved along the vertical direction z away from the other such that the first protrusion 226 is moved out of the second recess 192. When the first protrusions 226 is not in the second recess 192, the liquid material dispenser 100 and/or the air supply assembly 200 may be moved along the transverse direction x and/or the longitudinal direction y to further separate from each other.

In some examples, the first and second couplers 210 and 208 can each have a first connector and a second connector that are offset from another along the vertical direction z. For example, the first coupler 210 may include a second connector spaced from the first connector of the first coupler 210 along the vertical direction z, and the second coupler 180 may include a second connector spaced from the first connector of the second coupler 180 along the vertical direction z, wherein the second connectors of the first and second couplers 210 and 180 are configured to engage one another. When in the engaged configuration, the first connectors of the first and second couplers 210 and 208 can be engaged with one another so that relative movement between the first and second couplers 210, 180 is precluded along at least one, but not all, directions. When in the locked configuration, the second connectors of the first and second couplers 210 and 208 can be engaged with one another so as to preclude relative movement between the first and second couplers 210, 180 along all directions.

The second connector of the first coupler 210 can include at least one of a protrusion and a recess. The second connector of the second coupler 180 can include another of the protrusion and a recess. The second connectors of the first and second couplers 210 and 180 are configured to couple to one another. For example, the protrusion is configured to be received by the recess. The protrusion can extend along the vertical direction z, and the recess can be configured to receive the protrusion along the vertical direction z. In the example of FIGS. 6-9, the first coupler 210 comprises a protrusion 228 (labeled in FIG. 9), which extends from the first side 218. The protrusion 228 may also extend in a direction away from the first side 218. The second coupler 180 defines a recess 244 that is configured to receive the first protrusion 228 when the first and second couplers 210 and 180 are in the locked configuration.

Optionally, the second connector of each of the first and second couplers 210 and 180 can comprise a protrusion and define a recess. For example, the second connector of the first coupler 210 can additionally define a recess 232 between the protrusion 228 and the first side 218. Further, the second connector of the second coupler 180 may include a protrusion 240 extending away from the engagement surface 184, where the recess 244 is defined between the protrusion 240 and the engagement surface 184. The recess 232 is configured to receive the protrusion 240 therein when the first and second couplers 210 and 180 are in the engaged configuration. In some aspects, the recess 244 may be configured to receive the first protrusion 228 therein, such that the protrusion 228 is disposed, at least in part, between the engagement surface 184 and the protrusion 240. Similarly, in some aspects, the recess 232 may be configured to receive the protrusion 240 therein, such that the protrusion 240 is disposed, at least in part, between the first side 218 and the protrusion 228.

In some aspects, it may be beneficial to releasably secure the first coupler 220 to the second coupler 180 in the locked configuration when the couplers are engaged with one another. The first coupler 210 or the second coupler 180 may include a locking assembly 234 that is configured to selectively secure and release engagement between the dispenser 100 and the air supply assembly 200. For example, in FIG. 3, the second coupler 180 comprises the locking assembly 234, and thus can be considered to be the second connector of the second coupler 180. As another example, in FIG. 11, the first coupler 210 comprises the locking assembly 234, and thus can be considered to be the second connector of the first coupler 210. The locking assembly 234 is configured to releasably engage with a fastener receptacle 196. The locking assembly 234 may include a body 236 that is configured to contact the dispenser 100 and the air supply assembly 200. In some aspects, the body 236 may be an integrated part of a single component of the air supply assembly 200 or the dispenser 100. Alternatively, the body 236 may be a physically separated component from the air supply assembly 200 and the dispenser 100.

The locking assembly 234 can include a fastener 238 disposed thereon. The fastener may be disposed on the body 236. In some examples, the fastener 238 may be configured to be received within an opening in the body 236. In some aspects, the fastener 238 may be separable from the body 236. Alternatively, the fastener 238 may be configured to move relative to the body 236 but not be completely separable from the body. The fastener 238 is configured to be moved into the fastener receptacle 196. In some aspects, the locking assembly 234 may include a plurality of fasteners 238. Fasteners 238 may include a variety of different fastening mechanisms, such as threaded screws or bolts, clamps, pins or dowels, buckles, clips, ties, latches, or other suitable fasteners. For example, as shown in the exemplary arrangement depicted in FIGS. 7 and 7A, the fastener 238 may be a screw, for example a clamping screw, configured to be removably inserted into the fastener receptacle 236. In alternative arrangements, for example those depicted in FIG. 10, the fastener 238 may be a threaded stud with a floating nut.

Figure 12:
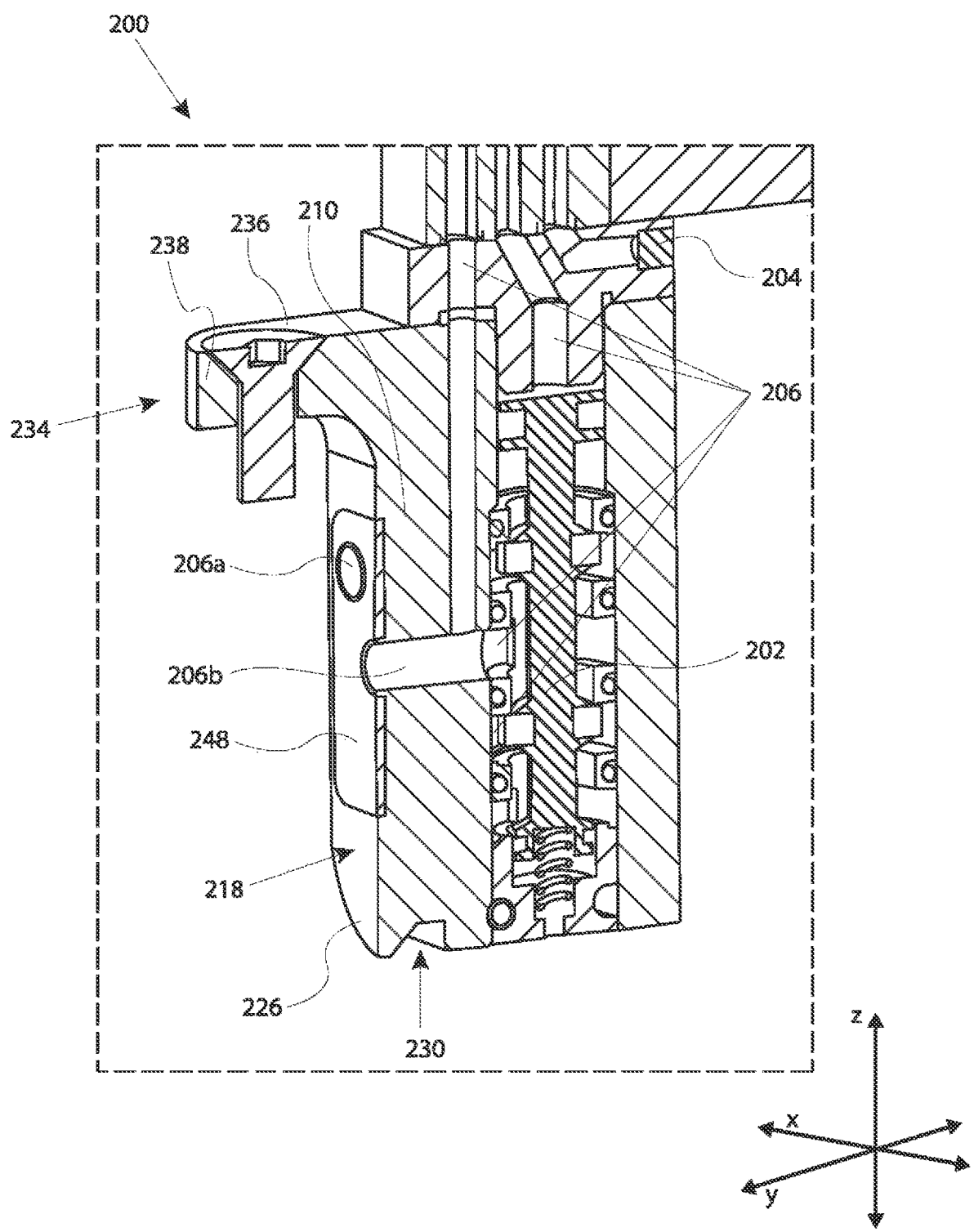
FIG. 12 illustrates a perspective cross-sectional view of the air supply assembly of FIG. 11.

The locking assembly 234 may be configured to be selectively moved into and out of engagement with a fastener receptacle 196. The locking assembly 234 may be disposed on one of the dispenser 100 (as shown in FIG. 2) and the air supply assembly 200 (as shown in FIG. 11), while the fastener receptacle 196 may be disposed on the other of the dispenser 100 and the air supply assembly 200, such that when the locking assembly 234 is engaged with the fastener receptacle 196, the dispenser 100 is affixed to the air supply assembly 200. In some aspects, for example as shown in FIGS. 7-10, the locking assembly 234 may be separate from the dispenser 100 and the air supply assembly 200 and may be configured to contact both the dispenser 100 and the air supply assembly 200 when engaged with the fastener receptacle 196. In alternative aspects, for example as depicted in FIGS. 11 and 12, the locking assembly 234 may be disposed on the air supply assembly 200, while the fastener receptacle 196 may be disposed on the dispenser 100. It will be appreciated that the relative placement of the components may be reversed, for example, to have the locking assembly 234 disposed on the dispenser 100, while the fastener receptacle 196 may be disposed on the air supply assembly.

In some aspects, the dispensing assembly 10 may include a plurality of locking assemblies 234, and this disclosure is not intended to be limited to a specific number of locking assemblies being utilized. In some examples, for example those depicted in the figures, the dispensing assembly 10 may include a single locking assembly 234. In some aspects, the single locking assembly 234 may include a single fastener 238. Having a system with a single locking assembly 234 and/or a single fastener 238 allows for easy and quick fastening or unfastening of the dispenser 100 and the air supply assembly 200 relative to the longer, more tedious, and more involved process described above in relation to existing systems that connect components via a plurality of tubes and fasteners.

In practice, to secure the dispenser 100 to the air supply assembly 200 after the components are oriented and positioned in the desired operational arrangement, a user may move the locking assembly 234 such that the locking assembly 234 is aligned with the fastener receptacle 196. The user may then move the fastener 238 into the fastener receptacle 196. The locking assembly 234 may contact the fastener receptacle 196. To release the components from each other, the user may remove the fastener 238 from the fastener receptacle 196. When the fastener 238 is removed from the fastener receptacle 196, the locking assembly 234 may be moved away from the fastener receptacle 196, and the dispenser 100 and the air supply assembly 200 may be separated.

In some aspects, the locking assembly 234 may be a physically separate component from the air supply assembly 200 and the dispenser 100 and may be configured to releasably contact both the dispenser 100 and the air supply assembly 200 when the dispenser 100 is fixed to the air supply assembly 200. The locking assembly 234 may be configured to be affixed to the dispenser 100 via the engagement of the fastener 238 with the fastener receptacle 196. The locking assembly 234 may be configured to be affixed to the air supply assembly 200 via a clamping engagement between the body 236 and the first coupler 210.

Figure 9:
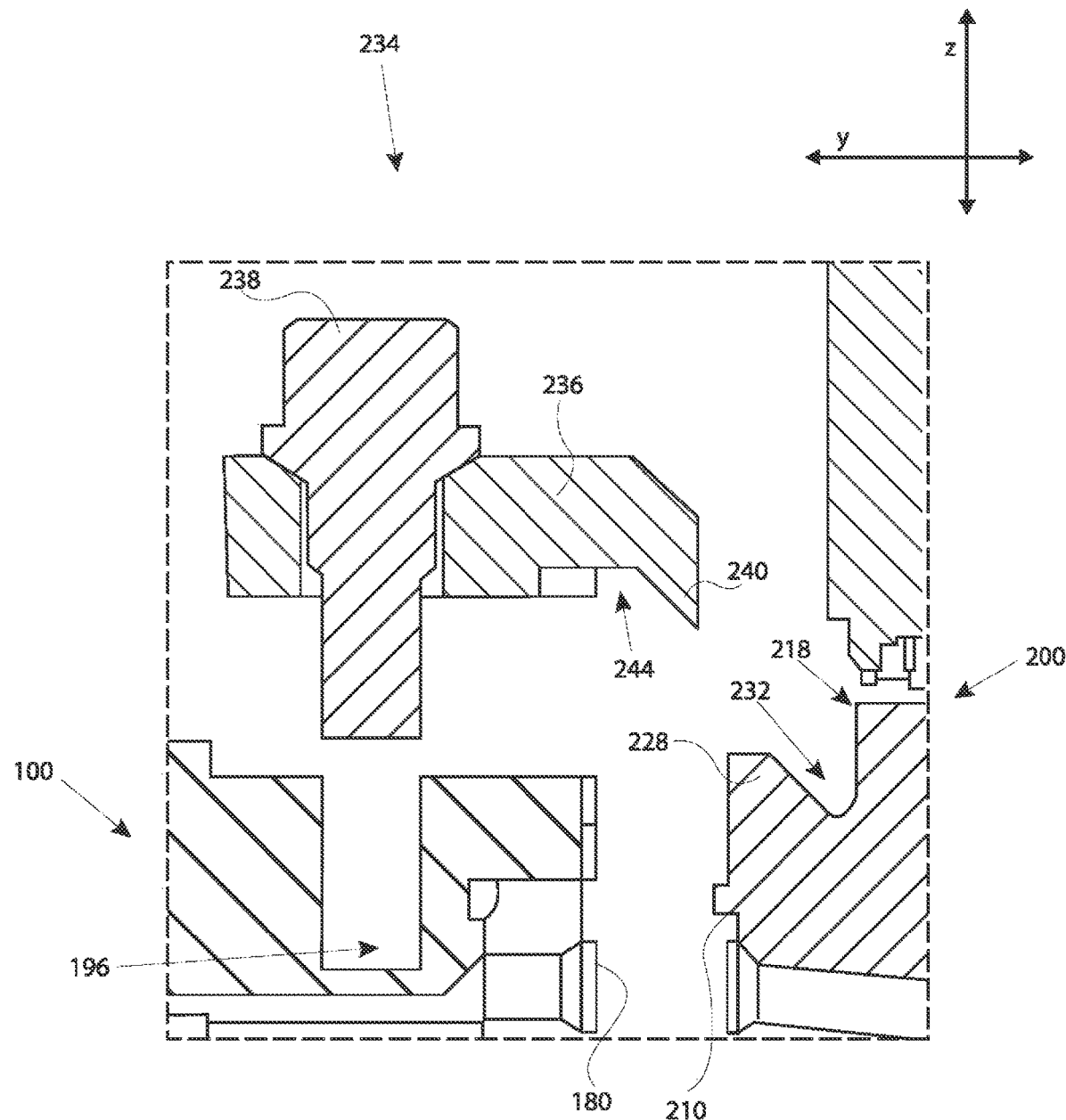
FIG. 9 illustrates a side cross-sectional view of the locking assembly of FIG. 8, shown in a disengaged configuration.
Figure 10:
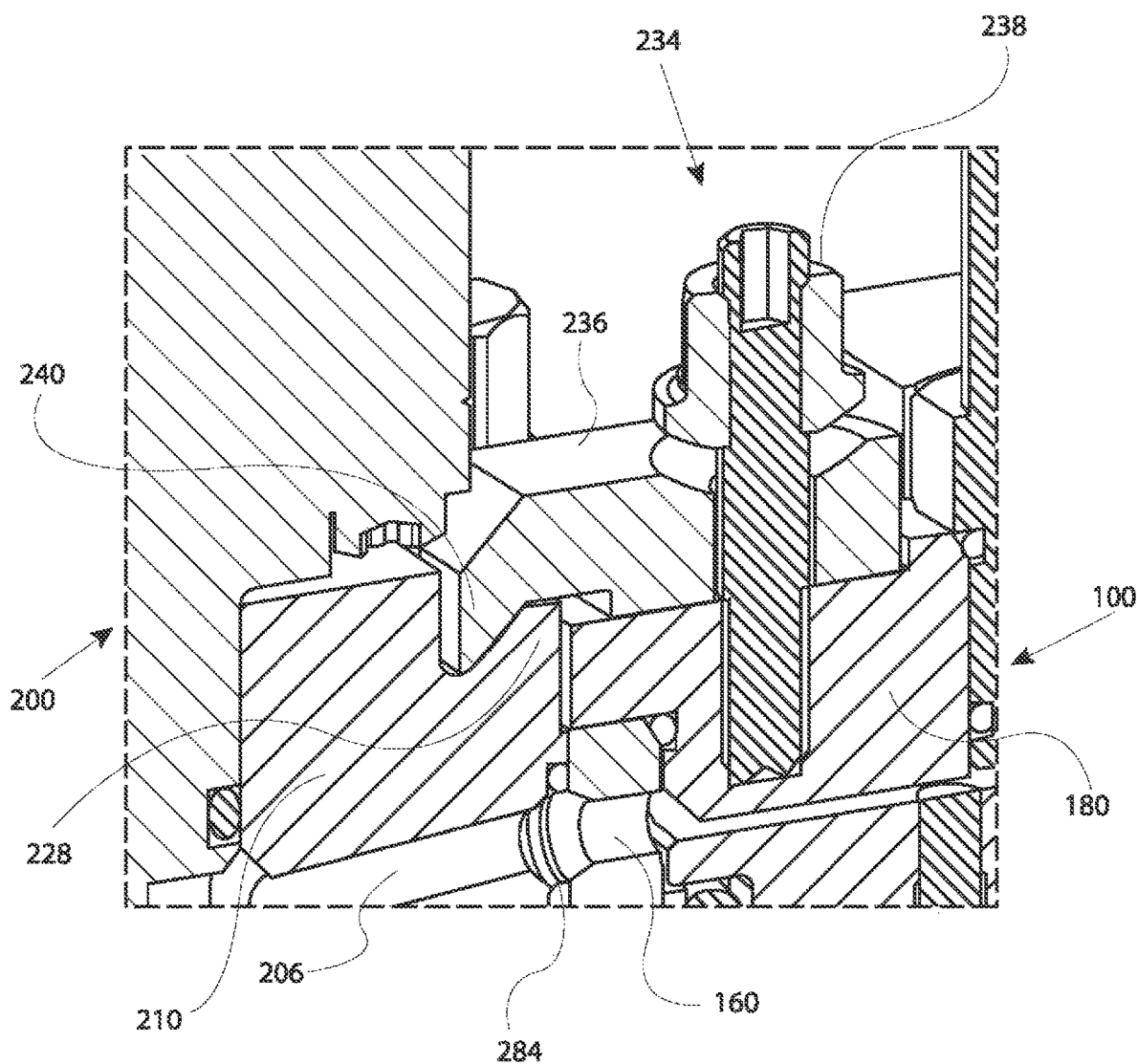
FIG. 10 illustrates a perspective cross-sectional view of a locking assembly according to another example of the disclosure.

The locking assembly 234 can be moved into interference with the first coupler 210 to the locked configuration so as to positionally fix the first and second couplers 210 and 180 relative to one another with respect to all directions. For example, the locking assembly 234 is configured to be secured to the dispenser 100 by moving the fastener 238 into the fastener receptacle 196 so as to cause the physical engagement between the third protrusion 228 and the fourth protrusion 240 to securely hold, or clamp, the locking assembly 234 to the air supply assembly 200, and thus, via the locking assembly 234, securely hold, or clamp, the locking assembly 234 to the dispenser 100. The securing can be caused by the physical interaction of a dovetail joint between the locking assembly 234 and the air supply assembly 200. Such an engagement is shown, for example, in FIG. 8. When the first and second couplers 280, 180 are engaged as described above, the dispenser 100 and the air supply assembly 200 are positionally fixed relative to one another relative to the transverse, longitudinal, and vertical directions x, y, and z. To disengage the dispenser 100 from the air supply assembly 200, the body 236 can be moved out of interference with the coupler 210. For example, the fastener 238 may be moved out of the fastener receptacle 196, and the body 236 may be moved such that the fourth protrusion 240 is moved out of the third recess 232 while the third protrusion 228 is moved out of the fourth recess 244. A disengaged locking assembly 234 is shown in FIG. 9.

When the dispenser 100 is in contact with the air supply assembly 200 such that the first coupler 210 is secured to the second coupler 180 as described above, the various channels extending through the air supply assembly 200 may be in alignment with channels extending through the dispenser 100. This may be referred to as a locked or engaged configuration for purposes of this description. For purposes of this description, channels that are aligned with each other are configured to be in fluid communication with each other, such that air may be moved between the air supply assembly 200 and the dispenser 100 via the aligned channels. Referring again to FIGS. 3-7, the plurality of channels 206 in the air supply assembly 200 may be aligned with the plurality of channels 160 in the dispenser 100. The plurality of channels 206 in the air supply assembly 200 may extend through the control valve 202 and through the first coupler 210. In some aspects, the first coupler 210 may include a first channel 206a extending therethrough and a second channel 206b extending therethrough. The first and second channels 206a, 206b are configured to fluidly communicate with at least some of the other of plurality of channels 206 in the air supply assembly 200, for example, with some of the channels in the control valve 202. The specific alignment of the first and second channels 206a, 206b in the first coupler 210 with other channels in the plurality of channels 206 in the air supply assembly 200 may depend on the operation and the position of the control valve 202.

The plurality of channels 160 in the dispenser 100 may extend through the second coupler 180. The second coupler 180 may include a first channel 160a extending therethrough and a second channel 160b extending therethrough. The first channel 160a may be in fluid communication with the first chamber 148. The second channel 160b may be in fluid communication with the second chamber 150. When the air supply assembly 200 is engaged with the dispenser 100, the first channel 206a in the first coupler 210 may be in fluid communication with the first channel 160a in the second coupler 180, and the second channel 206b may be in fluid communication with the second channel 160b. The fluid communication between the respective first channels 206a, 160a and between the respective second channels 206b, 160b may be configured to be air-tight such that air may travel between the aligned channels without substantial leakage. In some aspects, a seal 248 may be disposed between aligned channels. The seal 248 may be a gasket. The seal 248 may be an O-ring, a flat seal, or another suitable shape. The seal 248 may be held in compression between the first coupler 210 and the second coupler 180 when the air supply assembly 200 and the dispenser 100 are engaged together.

The first coupler 210 is configured to be aligned with the second coupler 180 such that the first side 218 of the first coupler 210 contacts the engagement surface of the second coupler 180 and is aligned along both the transverse direction x and the vertical direction z such that the channels 206a, 206b in the first coupler 210 are aligned with channels 160a, 160b, respectively, in the second coupler 180. The alignment along the vertical direction z may be facilitated by the interaction of the first protrusion 226 on the first coupler 210 and the second protrusion 188 on the second coupler 180. The first protrusion 226 may contact the second protrusion 188 along the vertical direction z, thus acting as a physical stop to limit the movement of the first coupler 210 relative to the second coupler 180 along the vertical direction z. To facilitate alignment of the two couplers in the transverse direction x, one of the first and second couplers 210, 180 may include walls disposed thereon that are configured to contact the other of the first and second couplers 210, 180. As shown in the example in FIG. 2, walls 182 may be defined on the second coupler 180. The walls 182 may be configured to contact the first coupler 210 to act as physical stops along the transverse direction x when the first side 218 of the first coupler 210 contacts the engagement surface 184 of the second coupler 180.

The embodiments described herein provide an advantage in that the selective engagement and disengagement of the air supply assembly 200 with or from the dispenser 100 can be accomplished by the user quickly and by requiring fewer components to be actuated compared to existing systems. For example, in some of the disclosed examples, to engage the components, a user needs to align the first coupler 210 with the second coupler 180 such that they are secured to each other, position the air supply assembly 200 relative to the dispenser 100 such that the desired channels in the plurality of channels 206 are in alignment with the desired channels in the plurality of channels 160, and secure the first coupler 210 to the second coupler 180 (and thus the air supply assembly 200 to the dispenser 100) via the locking assembly 234. In such arrangements, the user does not need to align and connect individual channels of the air supply assembly 200 with connection tubes and fasteners and then align and connect those tubes at their respective other ends to the individual channels on the dispenser 100. This saves time, requires less training, requires fewer users, decreases chances of user error and improper connection, decreases the quantity of connection components that could be damaged, and/or reduces chance of fluid leakage.

The advantages described above may also apply to disengaging or disconnecting the air supply assembly 200 from the dispenser 100. To disengage the components, a user may actuate the locking assembly 234, for example by moving the fastener 238 out of the fastener receptacle 196, then moving at least one of the air supply assembly 200 and the dispenser 100 such that the first and second couplers 210, 180 are separated.

In some aspects, a single dispenser 100 may be configured to selectively engage with a plurality of different air supply assemblies 200, for example, those having different shapes, control valves, and/or arrangement of channels. In some aspects, a single air supply assembly 200 may be configured to selectively engage with a plurality of different liquid material dispensers 100, for example, those having different shapes, actuation mechanisms, dispensing arrangements, and/or channels extending therethrough. In some aspects, the first coupler 210 may be removed from the air supply assembly 200 and replaced with a different first coupler 210. In some aspects, the second coupler 180 may be removed from the dispenser 100 and replaced with a different second coupler 180. The aspects described throughout this application allow for interchangeability of components.

In some existing systems, the material to be dispensed has to be heated. The high temperatures necessary to liquefy the material to be dispensed can damage the control valves and other components. Because of this, control valves are often mounted at a predetermined distance away from the heated portions that is deemed sufficient to protect components from the heat. Locating the air supply assembly 200 spaced far away from the dispenser 100 requires additional components (e.g. tubes to carry the air from the air supply assembly 200 to the dispenser 100). Such arrangements additionally have a larger footprint and take up more space in a manufacturing facility. It is desirable to utilize systems in which the air supply assembly 200 is disposed closer to, or immediately adjacent to, the dispenser 100 in order to decrease the required space for the overall dispensing assembly 10 and to eliminate the need for additional connecting components. Such exemplary systems are described above.

Examples of dispensing assemblies 10 described throughout this application may include an insulation component configured to thermally insulate the air supply assembly 200, and specifically the control valve 202, to protect the heat-sensitive components from the heat at or in relation to the dispenser 100. In some embodiments, the first coupler 210 may also function as a heat insulator to thermally insulate at least a part of the air supply assembly 200 from the heat imparted by the dispenser 100. In some examples, the first coupler 210 may be disposed between the control valve 202 and the dispenser 100. The first coupler 210 is configured to protect the control valve 202 from the heat radiating from the heated dispenser 100. It will be understood that the specific material being used to form the first coupler 210 should be sufficient to insulate the control valve 202, and the material may be selected to depend on the desired temperature range of the heated liquid material dispenser, the duration of heating while the air supply assembly 200 is engaged with the liquid material dispenser, the presence of optional additional insulating components, the heat tolerance of the control valve 202, and/or other aspects that would dictate the necessary insulation qualities. Similarly, the dimensions of the first coupler 210 may be dictated by one or more of the factors described above. It will be understood that the greater the size of the first coupler 210 (measured, for example, along the longitudinal direction y between the coupler's first side 218 and the second side 222), the greater the insulation may be.

In some embodiments, components in the liquid dispensing assembly 100 and/or the air supply assembly 200 may be formed from, or include therein, a thermally insulating material. While this disclosure is not limited to particular insulating materials, suitable materials may include plastics, ceramics, or other nonmetallic insulating materials (e.g., PPS). The term "nonmetallic" as used herein is meant to encompass materials having no metal whatsoever, for example, plastics or the like, or composites that may have small amounts of metal, for example composites that include fibers added to reinforce the component but that otherwise comprise primarily non-metal material.

Incorporating an insulation component as described above allows for the air supply assembly 200 to be disposed closer to the dispenser 100 than in existing systems. This decreases the necessary footprint of the entire dispensing assembly 10. In some examples, the air supply assembly 200 may be disposed immediately adjacent to the dispenser 100 with the insulating component (e.g. the first coupler 210) disposed between the control valve 202 and the dispenser 100.

In some embodiments, a separate insulating component may be disposed on or adjacent the control valve 202 between the control valve 202 and the dispenser 100. The separate insulating component may be disposed between the control valve 202 and the first coupler 210. Additionally, or alternatively, the insulating component may be disposed between the first coupler 210 and the dispenser 100. In some aspects, multiple insulation components may be disposed between the control valve 202 and the heated portion of the dispenser 100. In some preferred embodiments, such as those depicted in FIGS. 1-10, the insulating component may be part of, or the entirety, of the first coupler 210. The placement of the first coupler 210 between the dispenser 100 and the control valve 202 helps thermally insulate the control valve 202 from the heat in the dispenser 100.

Referring to the example depicted in FIGS. 11 and 12, the air supply assembly 200 may include a first coupler 210 that is configured to encompass at least a portion of the control valve 202. In such aspects, the first coupler 210 may be not configured to be separated from the rest of the air supply assembly 200. The first coupler 210 may include insulation material as described above. The first coupler 210 may define a chamber 250 extending therethrough and being configured to receive at least a portion of the control valve 202 therein. As depicted in the figures, the first coupler 210 may be configured to envelop at least a portion of the control valve 202 in a radial direction (extending from the control valve 202 in the plane defined by the transverse and longitudinal directions x and y). Surrounding at least a portion of the control valve 202 with the first coupler 210 having an insulating material may help insulate the control valve 202 from undesirably high temperatures due to heat radiating from the dispenser 100 when the dispenser 100 is engaged with the air supply assembly 200.

As depicted in the example shown in FIGS. 11 and 12, the locking assembly 234 may be integrated with the air supply assembly 200. For example, the locking assembly 234 may be part of a monolithic component including the first coupler 210 and the locking assembly 234.

As described above, pressurized air is introduced into the disclosed embodiments to control the dispensing of the material from the dispenser 100. In some disclosed examples, the pressurized air can be selectively directed by the control valve 202 into the first chamber 148 of the dispenser 100 or into the second chamber 150. Moving air into the first chamber 148 causes the plunger 152 and the connected valve stem 156 to move in a first direction away from the valve seat 128, thus allowing the material within the dispensing chamber 124 to exit the dispenser. Conversely, moving air into the second chamber 150 causes the plunger 152 and the connected valve stem 156 to move in a second direction opposite the first direction to move towards the valve seat 128 and to contact the valve seat 128, forming a liquid-tight seal, thus preventing the material within the dispensing chamber 124 from moving out of the dispenser 100. After the desired movement of the plunger 152 and valve stem 156 is achieved, the air that is introduced into the first and second chambers 148, 150 that caused the desired movement needs to be discharged from the dispensing assembly 10. To exit the dispensing assembly 10, air from the first chamber 148 may move through the first channel 160a in the second coupler 180, through the first channel 206a in the first coupler 210, through the control valve 202, and into a first air outlet channel 262a (shown in FIG. 3). Similarly, air from the second chamber 150 may move through the second channel 160b in the second coupler 180, through the second channel 206b in the first coupler 210, through the control valve 202 and connected channels 206, and into a second air outlet channel 262b. The first and second air outlet channels 262a, 262b may be open to the atmosphere such that the air traveling therethrough can exit the dispensing assembly 10.

In some conventional dispensing systems, when the pressurized air leaves the dispensing system, the movement of air results in high noise output, which negatively affects manufacturing conditions. In order to decrease the undesired noise, some systems may include a noise reduction component. Referring back to FIGS. 5-7, examples of dispensing assemblies 10 described throughout this application may include a silencer 260 disposed thereon configured to reduce the noise associated with pressurized air leaving the dispensing assembly 10. The dispensing assembly 10 may include one or a plurality of silencers 260. Each silencer 260 may be in fluid communication with a channel configured to receive pressurized air therein. The dispensing assembly 10 may include one or more silencers 260 on the liquid material dispenser 100, on the air supply assembly 200, or on both. In some aspects, the dispensing assembly 10 may include one or more silencers 260 on the liquid material dispenser and one or more silencers 260 on the air supply assembly 200. The silencers 260 on the air supply assembly 200 may be disposed in, adjacent to, or otherwise in fluid communication with one or more of the plurality of channels 206. The silencers 260 on the dispenser 100 may be disposed in, adjacent to, or otherwise in fluid communication with one or more of the plurality of channels 160.

Figure 5:
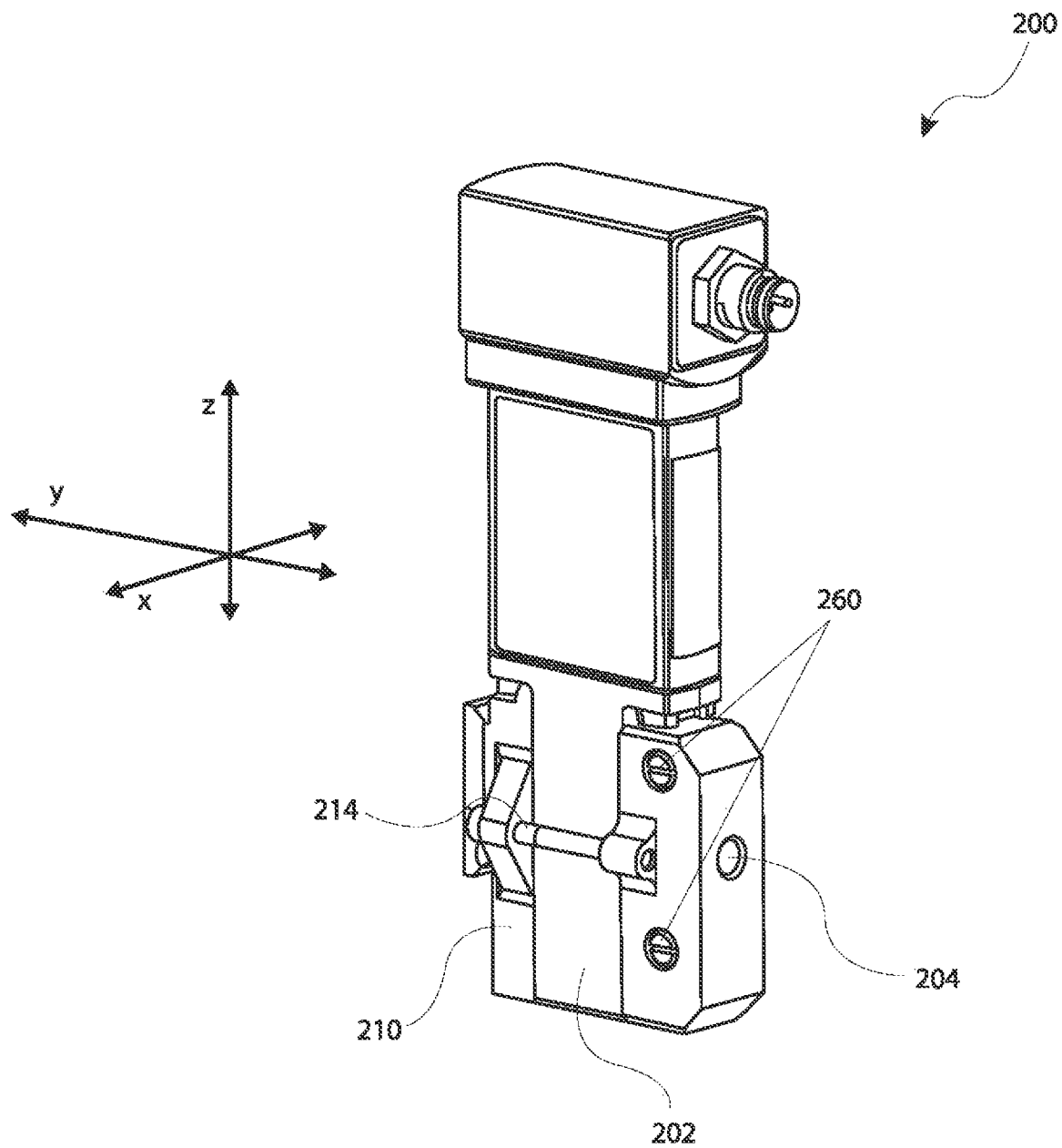
FIG. 5 illustrates a perspective view of an air supply assembly according to an example of the disclosure.
Figure 6:
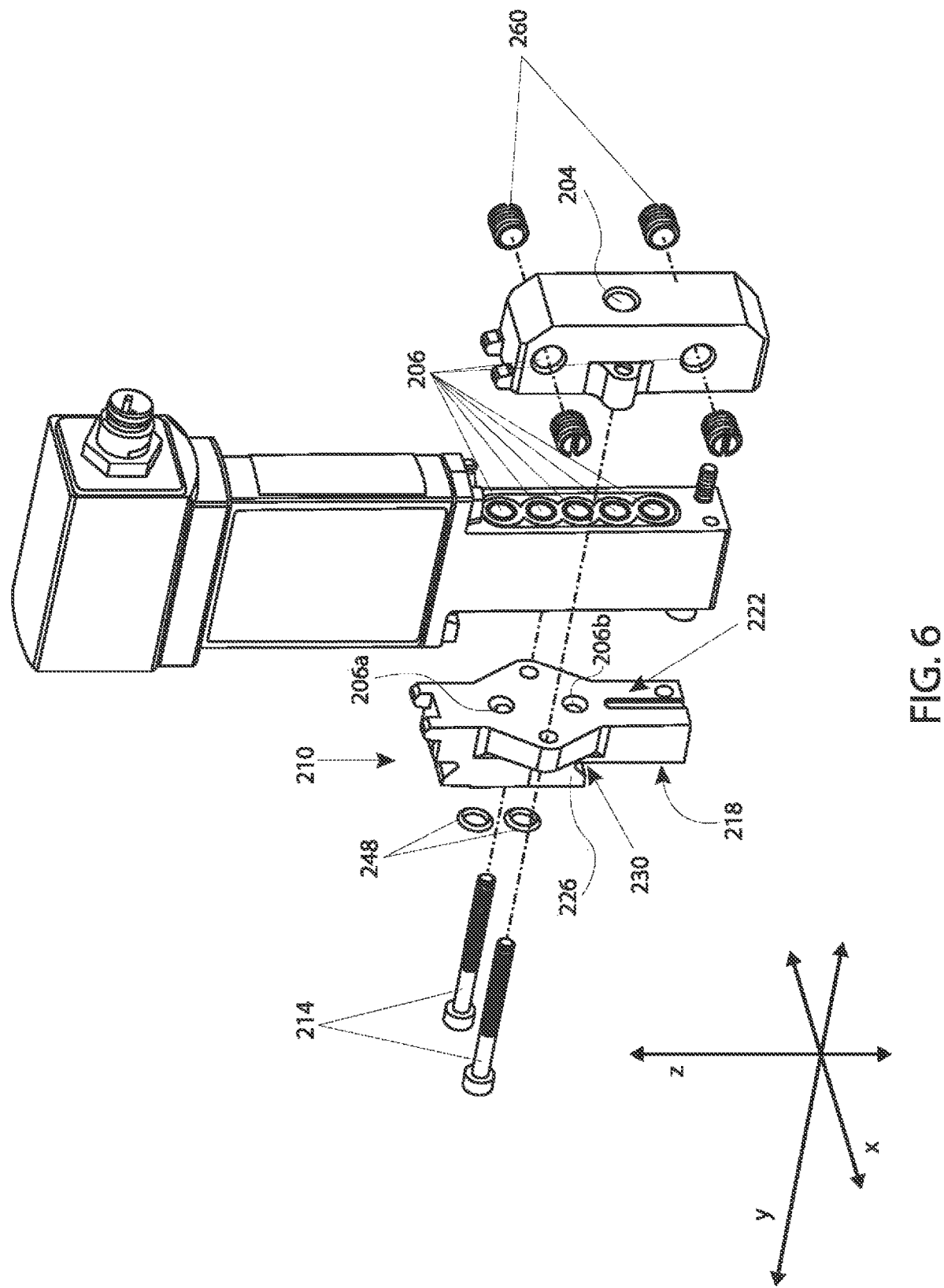
FIG. 6 illustrates an exploded perspective view of the air supply assembly of FIG. 5.
Figure 6A:
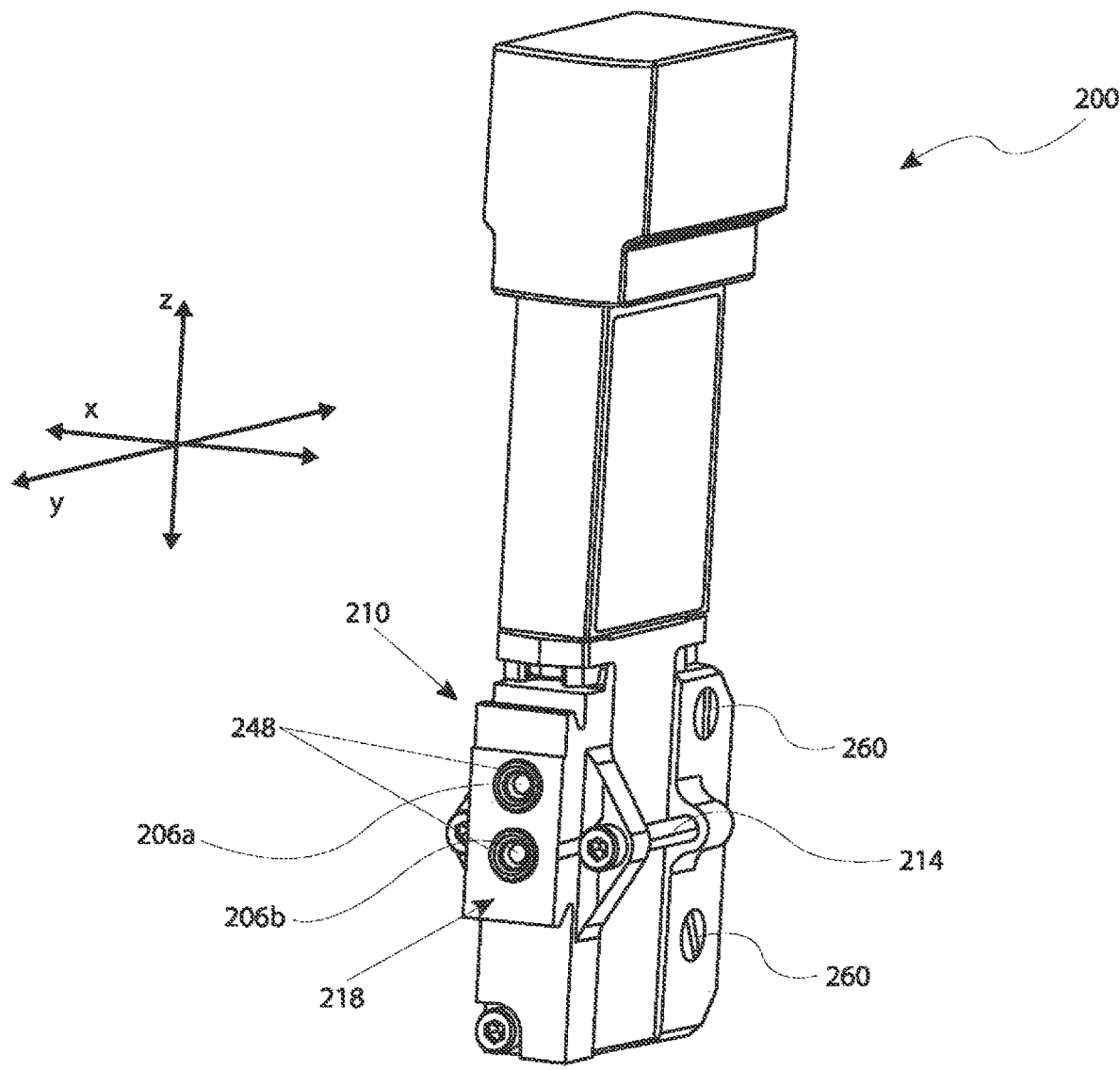
FIG. 6A illustrates another perspective view of the air supply assembly of FIGS. 5 and 6.
Figure 7:
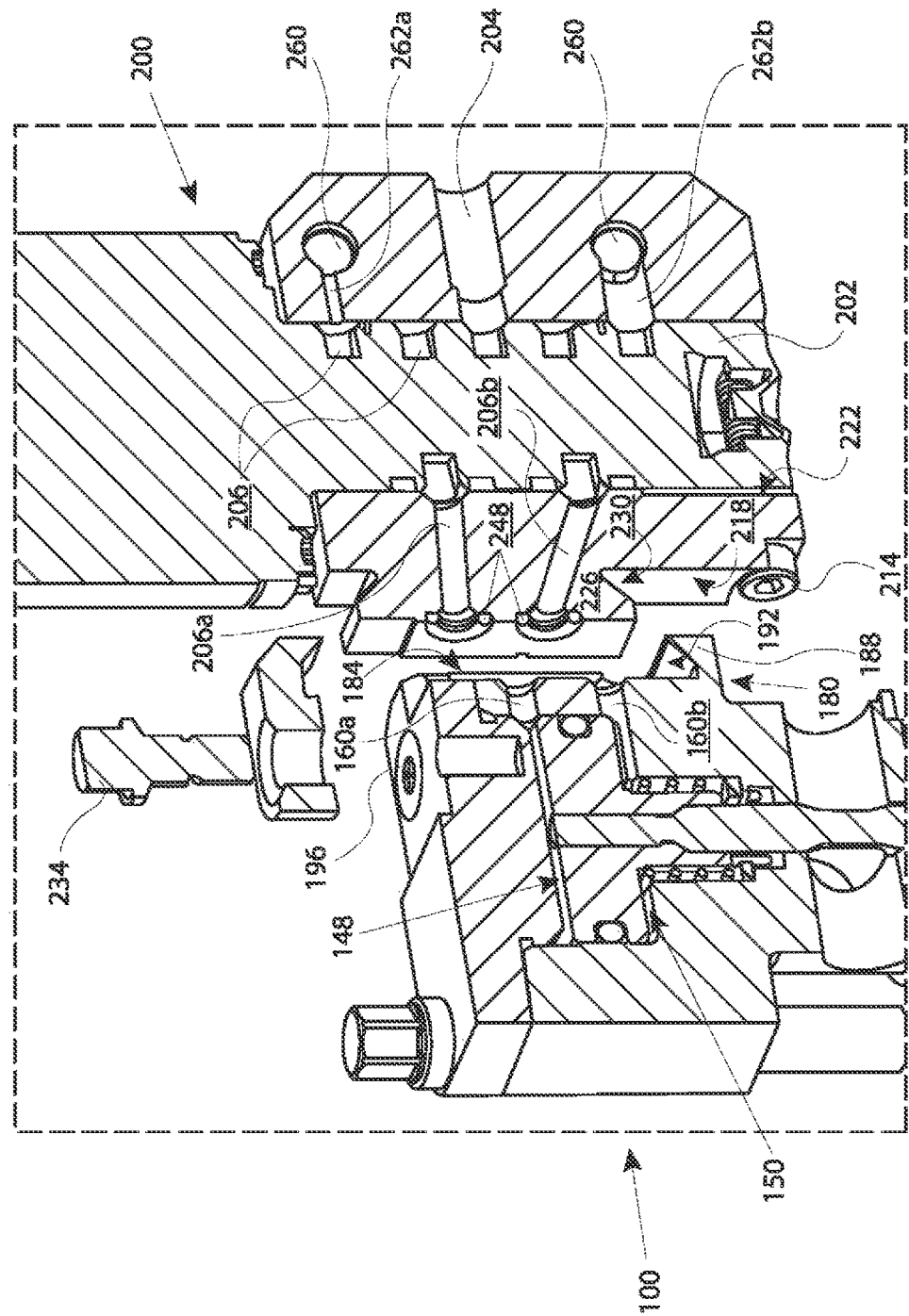
FIG. 7 illustrates a perspective cross-sectional view of a portion of a dispensing assembly according to an example of the disclosure.
Figure 7A:
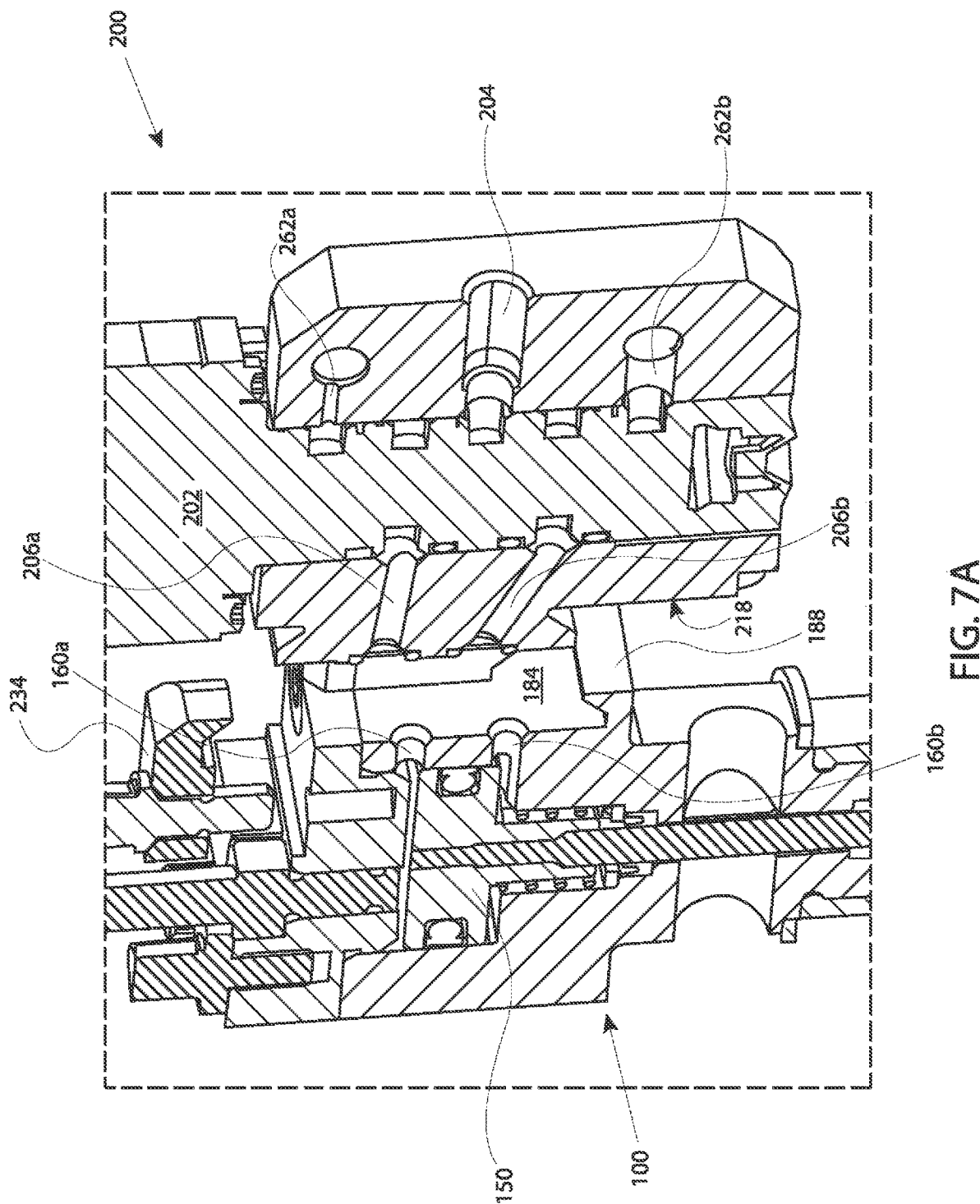
FIG. 7A illustrates another perspective cross-sectional view of the portion of the dispensing assembly of FIG. 7.
Figure 8:
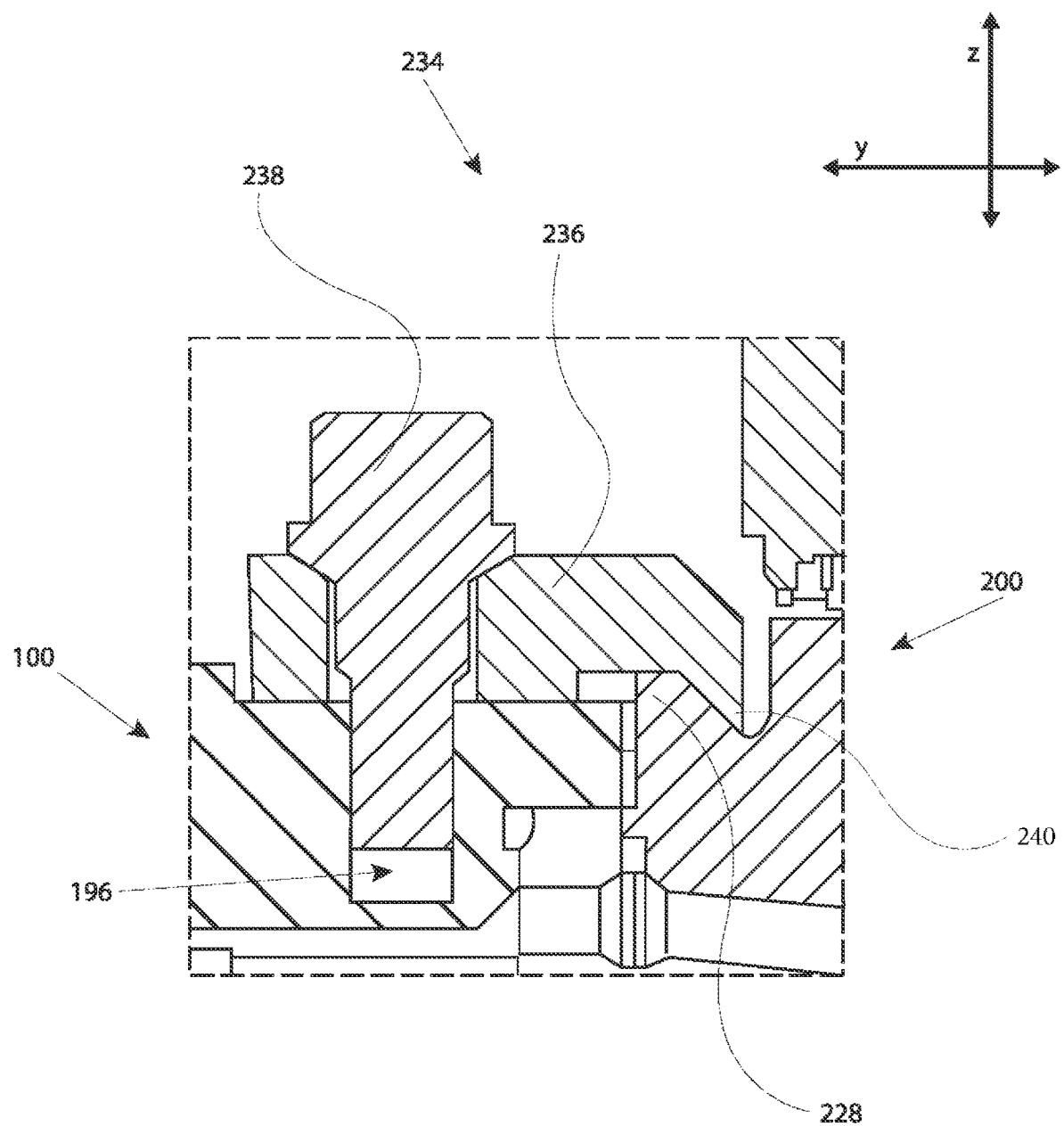
FIG. 8 illustrates a side cross-sectional view of a locking assembly according to an example of the disclosure, shown in a locked configuration.

Referring to FIGS. 5-7, for example, a plurality of silencers 260 are depicted disposed on the air supply assembly 200. Each silencer 260 is disposed, at least partly, within an air outlet channel, depicted as a first air outlet channel 262*a* and a second air outlet channel 262*b* in FIGS. 7 and 7A. Incorporating a plurality of silencers 260 allows for quieter air release compared to existing systems with one or no silencers while maintaining the desired air pressure within the system. Some existing systems utilize either no silencers or a single silencer per outlet channel. This results in louder operation, which is undesired. To reduce noise, one option is to decrease the size of the silencer used. However, if the silencer is too small, the air within the dispensing assembly 10 cannot exit the assembly fast enough to keep up with the desired dispensing speed. According to some of the examples disclosed in this application, it may be preferable to utilize two silencers 260 per each air outlet channel 262. Each silencer 260 is smaller relative to the silencers utilized in existing systems, but by having a plurality of such silencers, the pressurized air is permitted to exit the dispensing assembly 10 at the desired flow rate. In some specific examples, each silencer 260 may be formed of a bronze, brass, or stainless-steel centered metal. In some specific non-limiting embodiments, each silencer 260 may include an M5-size thread. It will be appreciated that this application is not intended to limit the disclosed embodiments by any specific number of silencers 260. It will also be understood that the size, shape, and composition of each silencer 260 may depend on the intended use, how much noise reduction is desired, how much air is to be passed through each silencer 260, and/or other operational parameters.

To achieve the desired dispensing speed, it may be advantageous to minimize the total volume of pressurized air being moved towards and away from the first and second chambers 148, 150. The lower the total air volume being moved through the control valve 202, the connected channels 206, and the chambers 148, 150, the faster the dispensing process can be controlled. Accordingly, the disclosed examples having an air supply assembly 200 being directly coupled to a dispenser 100 (rather than connected via tubes or other conduits) provides a shorter path for the air to travel between the air supply assembly 200 and the respective first or second chamber 148, 150. The shorter path decreases the total volume of air necessary to achieve the dispensing actions described above, relative to existing systems.

It should be noted that the illustrations and descriptions of the examples shown in the figures are for exemplary purposes only, and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more examples or that one or more examples necessarily include these features, elements and/or steps.

The terms "comprising," "including," "having," and the like are synonymous and are used inclusively, in an open-ended fashion, and do not exclude additional elements, features, acts, operations, and so forth.

While certain examples have been described, these examples have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. An air supply assembly for an adhesive dispenser, the air supply assembly comprising:
    a control valve that defines an air inlet channel and at least one air channel configured to direct a pressurized air to the adhesive dispenser, the control valve configured to receive said pressurized air from the air inlet channel and to direct the pressurized air to the at least one air channel; and
    a first coupler configured to releasably engage a second coupler of the adhesive dispenser, the second coupler defining at least one air channel therethrough and the first coupler defining at least one air channel therethrough that is configured to direct said pressurized air between the at least one air channel of the second coupler and the at least one air channel of the control valve, the first coupler being formed from a thermally insulating material and being arranged between a dispenser side and the control valve.

2. An adhesive dispensing assembly comprising the air supply assembly of claim 1, the adhesive dispensing assembly further comprising:
    the adhesive dispenser configured to receive a liquid material therein and to discharge the liquid material therefrom onto a substrate, the adhesive dispenser comprising the second coupler.

3. The adhesive dispensing assembly of claim 2, wherein the at least one air channel of the control valve includes a first channel and a second channel different from the first channel, and the control valve is configured to move between at least a first position and a second position different from the first position, wherein when the control valve is in the first position, the control valve is configured to direct the pressurized air to the first channel, and when the control valve is in the second position, the control valve is configured to direct the pressurized air to the second channel.

4. The adhesive dispensing assembly of claim 2, wherein the dispenser is a hot melt adhesive dispenser.

5. The adhesive dispensing assembly of claim 3, wherein the first coupler is removably coupled to a housing of the control valve.

6. The adhesive dispensing assembly of claim 3, wherein the first coupler is integral and monolithic with a housing of the control valve.

7. The adhesive dispensing assembly of claim 2, wherein:
the adhesive dispensing assembly defines an air outlet channel configured to discharge the pressurized air therethrough out of the dispensing assembly; and
the adhesive dispensing assembly comprises a silencer disposed within the air outlet channel and configured to permit the pressurized air to pass therethrough.

8. The adhesive dispensing assembly of claim 7, wherein the air outlet channel includes a first outlet opening and a second outlet opening, the air outlet channel being configured to receive the pressurized air therein and to direct the pressurized air into each of the first outlet opening and the second outlet opening, and wherein each of the first outlet opening and the second outlet openings includes a silencer therein.

9. The adhesive dispensing assembly of claim 2, further comprising a seal disposed on at least one of the first coupler and the second coupler, the seal configured to form an air-tight seal between a channel extending through the air supply assembly and a channel extending through the dispenser when the first coupler is in contact with the second coupler.

10. The adhesive dispensing assembly of claim 2, wherein one of the first coupler and the second coupler comprises a locking assembly configured to releasably secure the first coupler and the second coupler to one another such that the first coupler and the second coupler are positionally fixed relative to one another in all directions.

11. The adhesive dispensing assembly of claim 10, wherein the locking assembly includes a fastener, and one of the air supply assembly and the dispenser includes a receptacle configured to receive the fastener therein.

12. The adhesive dispensing assembly of claim 11, wherein the fastener is a screw.

13. The air supply assembly of claim 1, wherein the first coupler defines one of a plug and a receptacle that is configured to engage another of a plug and a receptacle that is defined by the second coupler.

14. The air supply assembly of claim 1, wherein the first coupler includes a connector that defines at least one of a protrusion and a recess that is configured to engage another of a protrusion and a recess that is defined on the second coupler.

15. The air supply assembly of claim 1, wherein the first coupler includes a connector that defines both a protrusion and a recess, wherein the protrusion is configured to be received in a recess of the second coupler and the recess is configured to receive a protrusion of the second coupler.

16. The air supply assembly of claim 14, wherein the first coupler comprises a second connector that is spaced from the connector along a first direction, and wherein the connector of the first coupler is configured to engage a first connector of the second coupler and the second connector of the first coupler is configured to engage a second connector of the second coupler.

17. The air supply assembly of claim 16, wherein the second connector of the first coupler defines at least one of a protrusion and a recess that is configured to engage another of a protrusion and a recess of the second connector of the second coupler.

18. The air supply assembly of claim 16, wherein the second connector of the first coupler includes a protrusion and a recess, wherein the protrusion is configured to be received in a recess of the second connector of the second coupler, and a protrusion of the second connector of the second coupler is configured to be received in the recess of the second connector of the first coupler.

19. The air supply assembly of claim 1, wherein the first coupler is integral and monolithic with a housing of the control valve.

20. The air supply assembly of claim 1, further comprising a locking assembly configured to releasably secure the first coupler and the second coupler to one another such that the air supply assembly and the adhesive dispenser are positionally fixed relative to one another in all directions.

21. The air supply assembly of claim 1, wherein:
the air supply assembly defines an air outlet channel configured to receive the pressurized air from the control valve and to discharge the pressurized air out of the air supply assembly; and
the air supply assembly comprises a silencer disposed within the air outlet channel and configured to receive the pressurized air therethrough as the pressurized air is moved out of the air outlet channel.

22. The air supply assembly of claim 21, wherein the air outlet channel defines a plurality of outlet openings, each of the outlet openings having a silencer therein.

23. A method of connecting the air supply assembly of claim 1 to the adhesive dispenser, the method comprising:
coupling the first coupler and the second coupler to one another such that the adhesive dispenser and the air supply assembly are positionally fixed to one another, the thermally insulative material is between the adhesive dispenser and the air supply assembly, and the at least one air channel extending through the first coupler is aligned with the at least one air channel extending through the second coupler.

24. The method of claim 23, wherein one of the first coupler and the second coupler defines a plug and the other of the first coupler and the second coupler defines a receptacle, and coupling the first coupler and the second coupler to one another comprises receiving the plug in the receptacle.

25. The method of claim 23, wherein coupling the first coupler and the second coupler to one another comprises engaging a first connector of the first coupler with a first connector of the second coupler such that relative movement between the air supply assembly and the adhesive dispenser is prevented along at least one direction.

26. The method of claim 23, wherein coupling the first coupler and the second coupler to one another comprises aligning the at least one air channel extending from the air supply assembly through the first coupler with the at least one air channel extending through the second coupler to the adhesive dispenser.

27. The method of claim 23, wherein coupling the first coupler and the second coupler to one another comprises locking the first coupler and the second coupler to one another by engaging a second connector of the first coupler with a second connector of the second coupler such that relative movement between the air supply assembly and the adhesive dispenser is prevented along all directions.

28. The method of claim 27, wherein locking the first coupler and the second coupler to one another comprises actuating a locking assembly of one of the first coupler and the second coupler so as to engage the second connector of the first coupler with the second connector of the second coupler.

29. The air supply assembly of claim 1, further comprising:
an air outlet channel defining a first air outlet opening and a second air outlet opening, the air outlet channel configured to direct air received from the adhesive dispenser out of the first air outlet opening and the second air outlet opening to an environment outside of the control valve;
a first silencer disposed in the first air outlet opening; and
a second silencer disposed in the second air outlet openings.

30. The air supply assembly of claim 1, wherein the first coupler and the second coupler are movable relative to one another between a disengaged configuration, an engaged configuration, and a locked configuration.

31. The air supply assembly of claim 30, wherein in the disengaged configuration, the first coupler and the second coupler are not in engagement with one another.

32. The air supply assembly of claim 30, wherein in the engaged configuration, the first coupler and the second coupler are engaged and in contact with one another, such that relative movement between the first coupler and the second coupler is precluded along at least one, but not all, directions.

33. The air supply assembly of claim 32, wherein relative movement between the first coupler and the second coupler is precluded along each of a transverse direction and a longitudinal direction, but not along a vertical direction.

34. The air supply assembly of claim 30, wherein in the locked configuration, the first coupler and the second coupler are engaged with one another, such that relative movement between the first coupler and the second coupler is precluded in all directions.

35. The air supply assembly of claim 19, wherein the second coupler is integral and monolithic with a housing of the dispenser.

36. The adhesive dispensing assembly of claim 6, wherein the second coupler is integral and monolithic with a housing of the dispenser.

* * * * *